United States Patent
Maeno et al.

(10) Patent No.: US 7,773,281 B2
(45) Date of Patent: Aug. 10, 2010

(54) BEAM IRRADIATION APPARATUS

(75) Inventors: Yoshiaki Maeno, Mizuho (JP); Atsushi Yamaguchi, Ibi-Gun (JP)

(73) Assignees: Sanyo Electric Co., Ltd, Osaka (JP); Sanyo Optec Design Co., Ltd., Tokyo (JP)

( * ) Notice: Subject to any disclaimer, the term of this patent is extended or adjusted under 35 U.S.C. 154(b) by 0 days.

(21) Appl. No.: 12/496,334

(22) Filed: Jul. 1, 2009

(65) Prior Publication Data

US 2010/0002278 A1  Jan. 7, 2010

(30) Foreign Application Priority Data

Jul. 7, 2008  (JP)  .............................. 2008-177421

(51) Int. Cl.
G02B 26/08  (2006.01)
(52) U.S. Cl. .............. 359/209.1; 359/199.3; 359/200.1; 359/200.7; 359/201.1; 359/203.1; 250/235; 250/206.1
(58) Field of Classification Search ........................ None
See application file for complete search history.

(56) References Cited

U.S. PATENT DOCUMENTS 5,777,960 A * 7/1998 Ohno ...................... 369/44.14

2008/0068440 A1 * 3/2008 Hirakawa .................... 347/243
2008/0225304 A1 * 9/2008 Sakaue et al. ............... 356/622

FOREIGN PATENT DOCUMENTS

JP  1183988 A  3/1999

* cited by examiner

*Primary Examiner*—James Phan
(74) *Attorney, Agent, or Firm*—Ditthavong, Mori & Steiner, P.C.

(57) ABSTRACT

A beam irradiation apparatus includes: an optical element which changes a travel direction of a laser beam by being rotated in a predetermined direction; an actuator which rotates the optical element in the direction; a refractive element which is disposed in the actuator and rotates in association with rotation of the optical element; a servo beam source which emits a servo beam to the refractive element; a photodetector which receives the servo beam refracted by the refractive element and outputs a signal according to a position where the servo beam is received; and a power adjustment circuit which adjusts emission power of the servo beam source. The power adjustment circuit adjusts the emission power so that a reception amount of the servo beam in the photodetector becomes constant based on an output signal from the photodetector.

6 Claims, 8 Drawing Sheets

BEAM IRRADIATION APPARATUS

This application claims priority under 35 U.S.C. Section 119 of Japanese Patent Application No. 2008-177421 filed Jul. 7, 2008, entitled "BEAM IRRADIATION APPARATUS". The disclosers of the above applications are incorporated herein by reference.

BACKGROUND OF THE INVENTION

1. Field of the Invention

The present invention relates to a beam irradiation apparatus for irradiating a target region with a laser beam and, particularly, to a beam irradiation apparatus mounted on a so-called laser radar, for detecting the presence or absence of an obstacle in a target region and a distance to an obstacle based on reflection light of a laser beam emitted to a target region.

2. Description of the Related Art

In recent years, a laser radar is mounted on a family car or the like in order to enhance safety during driving. The laser radar emits a laser beam to the front in the driving direction and detects the presence or absence of an obstacle in a target region and distance to an obstacle. Generally, the laser radar scans a target region with a laser beam and, based on the presence or absence of reflection light in each of scanned positions, detects the presence or absence of an obstacle in each of the scanned positions. Further, based on required time from a laser beam emission timing in each scan position to a reflection light reception timing, the distance to the obstacle from the laser radar in the scan position is detected.

To enhance detection precision of a laser radar, a target region has to be properly scanned with a laser beam, and each scan position of a laser beam has to be properly detected. As a laser beam scanning mechanism, a scan mechanism using a polygon mirror and a lens-driving-type scan mechanism for two-dimensionally driving a lens for scan are known.

On the other hand, as a method different from the scan mechanisms, a mirror-turning-type scan mechanism can be proposed. In the scan mechanism, a mirror is supported so as to be driven about two axes. The mirror is turned about each of the drive shafts as an axis by an electromagnetic drive force between a coil and a magnet. A laser beam is obliquely incident on the mirror. By two-dimensionally driving the mirror about each of the drive shafts as an axis, a target region is scanned in the horizontal and vertical directions with reflection light of the laser beam by the mirror.

In the scan mechanism, scan positions of the laser beam in the target region correspond to turn positions of the mirror in a one-to-one corresponding matter. Therefore, the laser beam scan position can be detected by detecting the turn position of the mirror. The turn position of the mirror can be detected by, for example, detecting the turn position of another member which turns in association with the mirror.

FIGS. 8A and 8B show a configuration example in the case of detecting the turn position of another member. FIG. 8A shows a configuration example of the case of using a translucent member having a parallel plate shape as another member, and FIG. 8B shows a configuration example of the case of using a mirror member as another member.

FIG. 8A shows a semiconductor laser 601, a translucent member 602, and a position sensing device 603 (PSD). A laser beam emitted from the semiconductor laser 601 is refracted by the translucent member 602 disposed slightly tilted with respect to the axis of the laser beam, and the refracted beam is received by the PSD 603. When the translucent member 602 rotates as shown by arrows, the path of the laser beam changes as shown by a dotted line in the diagram, and the reception position of the laser beam on the PSD 603 changes. Therefore, according to the laser beam reception position detected by the PSD 603, the turn position of the translucent member 602 can be detected.

FIG. 8B shows a semiconductor laser 611, a mirror member 612, and a position sensing device 613 (PSD). A laser beam emitted from the semiconductor laser 611 is reflected by the mirror member 612 disposed slightly tilted with respect to the axis of the laser beam, and the reflected beam is received by the PSD 613. When the mirror member 612 rotates as shown by arrows, the path of the laser beam changes as shown by a dotted line in the diagram, and the reception position of the laser beam on the PSD 613 changes. Therefore, according to the laser beam reception position detected by the PSD 613, the rotation position of the mirror member 612 can be detected.

When the mirror member 612 rotates only by an angle $\alpha$ as shown in FIG. 8B, the rotation angle of the laser beam reflected by the mirror member 612 is $2\alpha$. Consequently, the light reception surface of the PSD 603 has to be enlarged. On the other hand, when the translucent member 602 is used as shown in FIG. 8A, even when the translucent member 602 rotates, the shift width of the laser beam passed through the translucent member 602 is not large. Therefore, as compared with the case of FIG. 8B, the light reception surface of the PSD 603 can be made much smaller, and the cost of the PSD can be suppressed.

In the configuration of FIG. 8A, the semiconductor laser 601 is normally controlled so that its emission power becomes constant. Generally, the power control is performed based on an output from a PD (Photo Detector) for a monitor in a laser package. That is, the emission power of the semiconductor laser 601 is controlled so that an output from the PD for a monitor has a predetermined magnitude.

In the case of making the translucent member 602 rotate as described above, in association with the rotation, the amount of light reflected by the laser beam incident surface and the outgoing surface of the translucent member 602 changes. Consequently, when the outgoing power of the semiconductor laser 601 is constant, the amount of the laser beam received by the PSD 603 changes in association with the rotation of the translucent member 602. With the change, an error occurs in a position detection signal output from the PSD 603. The error exerts an influence on the detection precision of the scan position of the laser beam in the target region.

SUMMARY OF THE INVENTION

An object of the present invention is to provide a beam irradiation apparatus capable of accurately detecting a scan position of a laser beam in a target region.

A beam irradiation apparatus as a main aspect of the present invention includes: an optical element which changes a travel direction of a laser beam by being rotated in a predetermined direction; an actuator which rotates the optical element in the direction; a refractive element which is arranged in the actuator and rotates in association with rotation of the optical element; a servo beam source which emits a servo beam to the refractive element; a photodetector which receives the servo beam refracted by the refractive element and outputs a signal according to a position where the servo beam is received; and a power adjustment circuit which adjusts emission power of the servo beam source. The power adjustment circuit adjusts the emission power so that a reception amount of the servo beam in the photodetector becomes constant based on the output signal from the photodetector.

BRIEF DESCRIPTION OF THE DRAWINGS

The above and further objects and novel features of the invention will more fully appear from the following description when the same is read with reference to the accompanying drawings.

Figure 1:
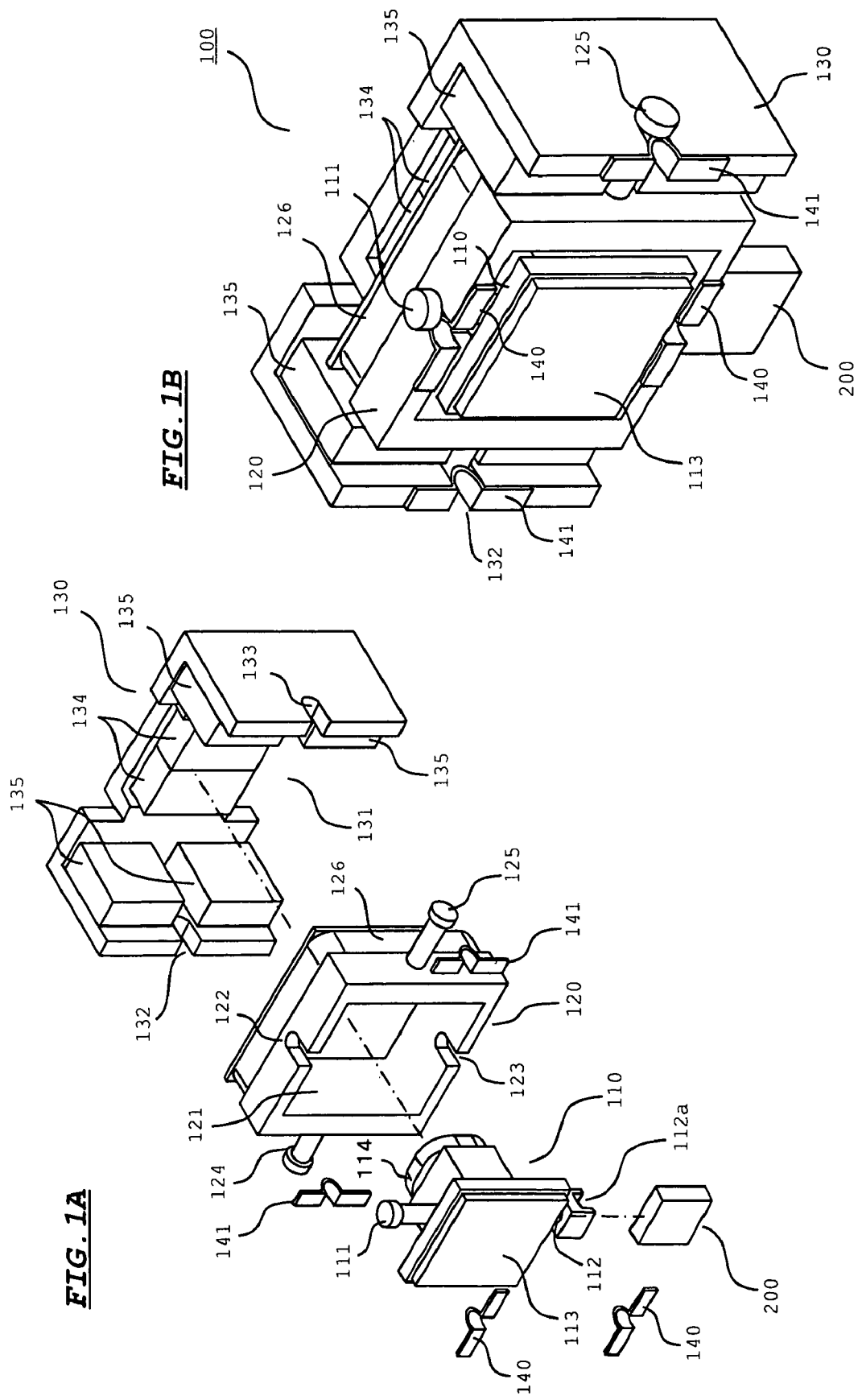
FIGS. 1A and 1B show the configuration of a mirror actuator according to an embodiment.

However, it is to be expressly understood that the drawing is for purpose of illustration only and is not intended as a definition of the limits of the invention.

DESCRIPTION OF THE PREFERRED EMBODIMENTS

FIGS. 1A and 1B show the configuration of a mirror actuator 100 according to an embodiment of the present invention. FIG. 1A is an exploded perspective view of the mirror actuator 100, and FIG. 1B is a perspective view of the mirror actuator 100 in an assemble state.

In FIG. 1A, 110 denotes a mirror holder. The mirror holder 110 includes a support shaft 111 having a retainer at its end and a support shaft 112 having a receiving part 112a at its end. A recess having a thickness almost the same as that of a transparent member 200 is formed in the receiving part 112a, and an upper part of the transparent member 200 is attached to the recess. Further, a flat-plate-shaped mirror 113 is attached to the front face of the mirror holder 110, and a coil 114 is attached to the rear face. The coil 114 is wound in a rectangular shape.

To the support shaft 112, the transparent member 200 having the parallel plate shape is attached via the receiving part 112a as described above. The transparent member 200 is attached to the support shaft 112 so that their two planes are parallel to the mirror surface of the mirror 113.

The mirror holder 110 is supported by a movable frame 120 while being rotatable about the support shafts 111 and 112. An opening 121 is formed in the movable frame 120 in order to accommodate the mirror holder 110, and grooves 122 and 123 are also formed in the movable frame 120 in order to engage the support shafts 111 and 112 of the mirror holder 110. Support shafts 124 and 125 having retaining members in end portions thereof are formed in side faces of the movable frame 120, and a coil 126 is attached to a back face of the movable frame 120. The coil 126 is wound in a rectangular shape.

The movable frame 120 is supported by a fixed frame 130 while being rotatable about the support shaft 124 and 125. A recess 131 is formed in the fixed frame 130 in order to accommodate the movable frame 120, and grooves 132 and 133 are also formed in the fixed frame 130 in order to engage the support shaft 124 and 125 of the movable frame 120. Magnets 134 and 135 are attached to an inner surface of the fixed frame 130. The magnets 134 apply a magnetic field to the coil 114, and the magnets 135 apply a magnetic field to the coil 126. The grooves 132 and 133 are extended from the front face of the fixed frame 130 into a gap between the upper and lower magnets 135.

A pressing plate 140 presses the support shafts 111 and 112 from the front side such that the support shafts 111 and 112 of the mirror holder 110 do not drop out from the grooves 122 and 33 of the movable frame 120. A pressing plate 141 presses the support shafts 124 and 125 from the front side such that the support shafts 124 and 125 of the movable frame 120 do not drop out from the grooves 132 and 133 of the fixed frame 130.

In assembling the mirror actuator 100, the support shafts 111 and 112 of the mirror holder 110 are engaged in the grooves 122 and 123 of the movable frame 120, and the pressing plate 140 is attached to the front face of the movable frame 120 while the front faces of the support shafts 111 and 112 are pressed. Therefore, the mirror holder 110 is rotatably supported by the movable frame 120.

After the mirror holder 110 is attached to the movable frame 120, the support shafts 124 and 125 of the movable frame 120 are engaged in the grooves 132 and 133 of the fixed frame 130, and the pressing plate 141 is attached to the front face of the fixed frame 130 while the front faces of the support shafts 132 and 133 are pressed. Therefore, the movable frame 120 is rotatably supported by the fixed frame 130, and the assembly of the mirror actuator 100 is completed.

The mirror 113 is rotated, when the mirror holder 110 is rotated about the support shaft 111 and 112 with respect to the movable frame 120. When the movable frame 120 is rotated about the support shafts 124 and 125 with respect to the fixed frame 130, the mirror holder 110 is rotate, and therefore the mirror 113 is integrally rotated. Thus, the mirror holder 110 is supported in the two-dimensionally rotatable manner by the support shafts 111 and 112 and the support shafts 124 and 125 which are orthogonal each other, and the rotation of the mirror holder 110 rotates the mirror 113 in the two-dimensional direction. At this time, the transparent member 200 attached to the support shaft 112 also rotates in association with the rotation of the mirror 113.

In the assembled state of FIG. 1B, an arrangement and polarities of the two magnets 134 are adjusted such that a rotational force is generated in the mirror holder 110 about the support shafts 111 and 112 by applying an electric current to the coil 114. Accordingly, when the current is applied to the coil 114, the mirror holder 110 is rotated about the support shaft 111 and 112 by an electromagnetic driving force generated in the coil 114.

In the assembled state of FIG. 1B, an arrangement and polarities of the two magnets 135 are adjusted such that a rotational force is generated in the movable frame 120 about the support shafts 124 and 125 by applying a current to the coil 126. Therefore, when current is applied to the coil 126, the movable frame 120 rotates about the support shafts 124 and 125 as axes by an electromagnetic drive force generated in the coil 126 and, in association with the rotation, the transparent member 200 rotates.

Figure 2:
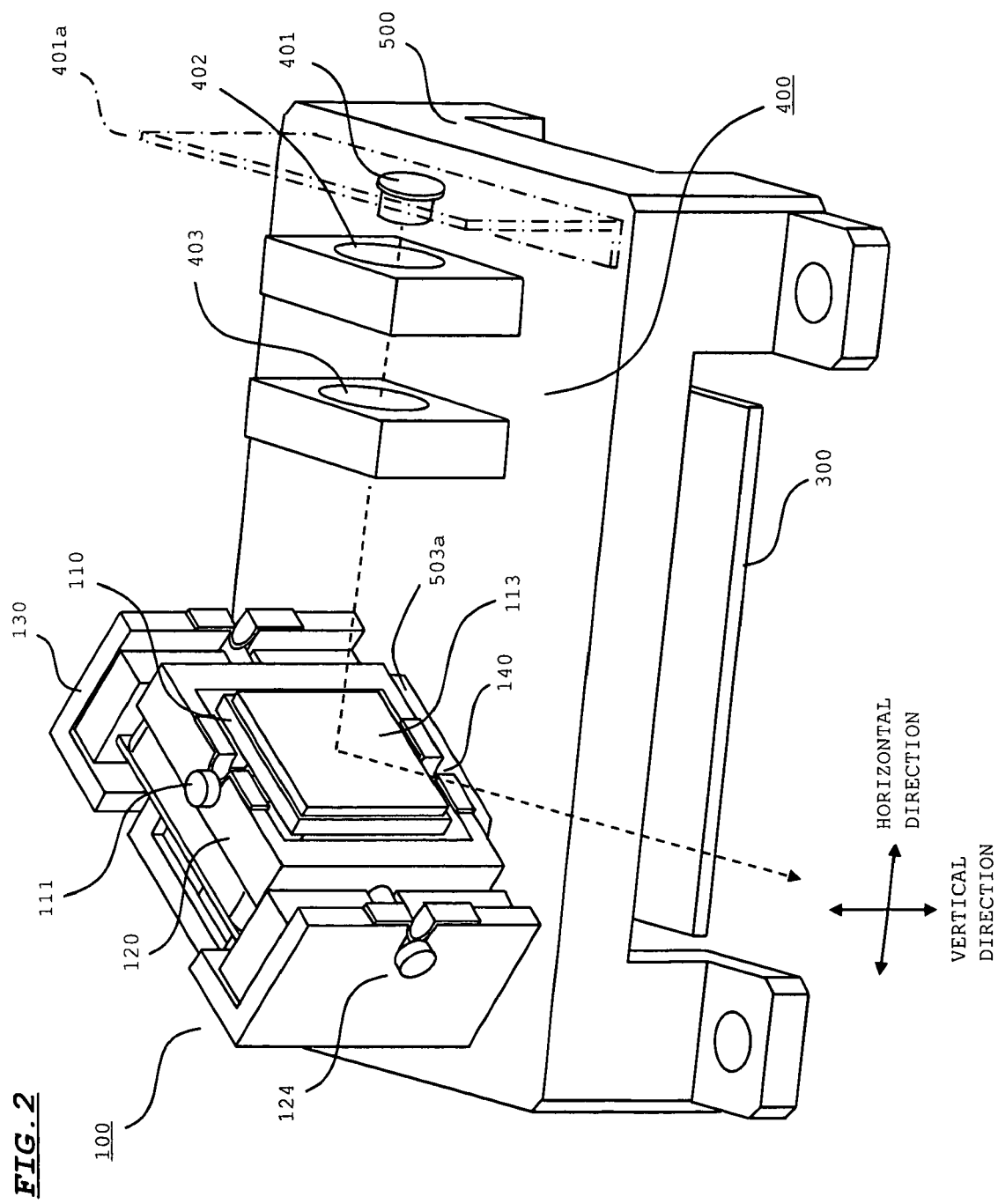
FIG. 2 shows an optical system of a beam irradiation apparatus in the embodiment.

FIG. 2 is a diagram showing the configuration of the optical system in a state where the mirror actuator 100 is attached.

In FIG. 2, 500 denotes a base that supports an optical system. In the base 500, an opening 503a is formed in a position where the mirror actuator 100 is mounted. The mirror actuator 100 is attached on the base 500 so that the transparent member 200 is inserted in the opening 503a.

On the top face of the base 500, an optical system 400 for guiding a laser beam to the mirror 113 is attached. The optical system 400 includes a laser light source 401 and beam shaping lenses 402 and 403. The laser light source 401 is attached to a substrate 401a for the laser light source disposed on the top face of the base 500.

A laser beam emitted from the laser light source 401 is subjected to actions of convergence in the horizontal and vertical directions of the lenses 402 and 403. The lenses 402 and 403 are designed so that a beam shape in a target region (which is set, for example, in a position in front of the beam emission port of the beam irradiation apparatus by about 100 m) has a predetermined size (for example, a size of about 2 m in the vertical direction and about 1 m in the horizontal direction).

The lens 402 is a cylindrical lens having the lens effect in the vertical direction, and the lens 403 is an aspheric lens that converts a laser beam to almost parallel beams. The spread angles in the vertical and horizontal directions of the beam emitted from the laser light source are different from each other. The first lens 402 changes the ratio between the spread angles in the vertical and horizontal directions. The second lens 403 changes the magnifications of the spread angles (in both of the vertical and horizontal directions) of the outgoing beam.

The laser beam passed through the lenses 402 and 403 is incident on the mirror 113 of the mirror actuator 100 and is reflected by the mirror 113 toward the target region. The mirror 113 is two-dimensionally driven by the mirror actuator 100, thereby two-dimensionally scanning the target region with the laser beam.

When the mirror 113 is in a neutral position, the mirror actuator 100 is disposed so that a laser beam from the lens 403 is incident on the mirror surface of the mirror 113 at an incident angle of 45 degrees in the horizontal direction. The "neutral position" is a position of the mirror 113 when the mirror surface is parallel to the vertical direction and the laser beam is incident on the mirror surface an incident angle of 45 degrees in the horizontal direction.

A circuit substrate 300 is disposed below the base 500. Further, also on the rear and side surfaces of the base 500, circuit substrates 301 and 302 are disposed.

Figure 3B:
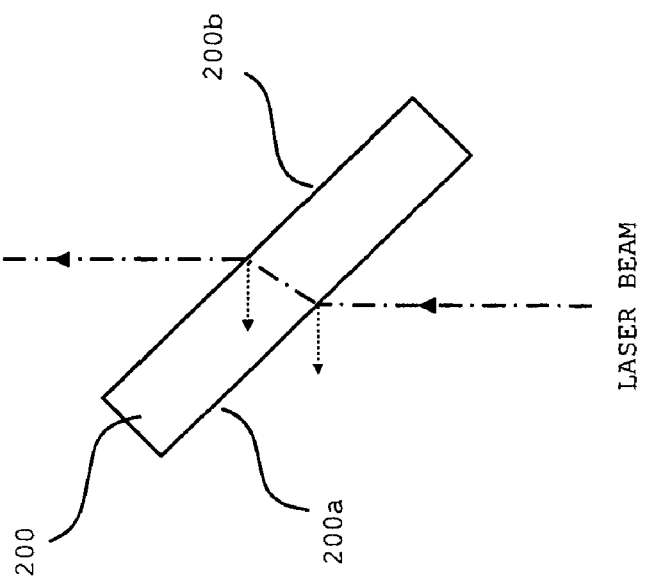
FIGS. 3A and 3B show the optical system of the beam irradiation apparatus in the embodiment.
Figure 3A:
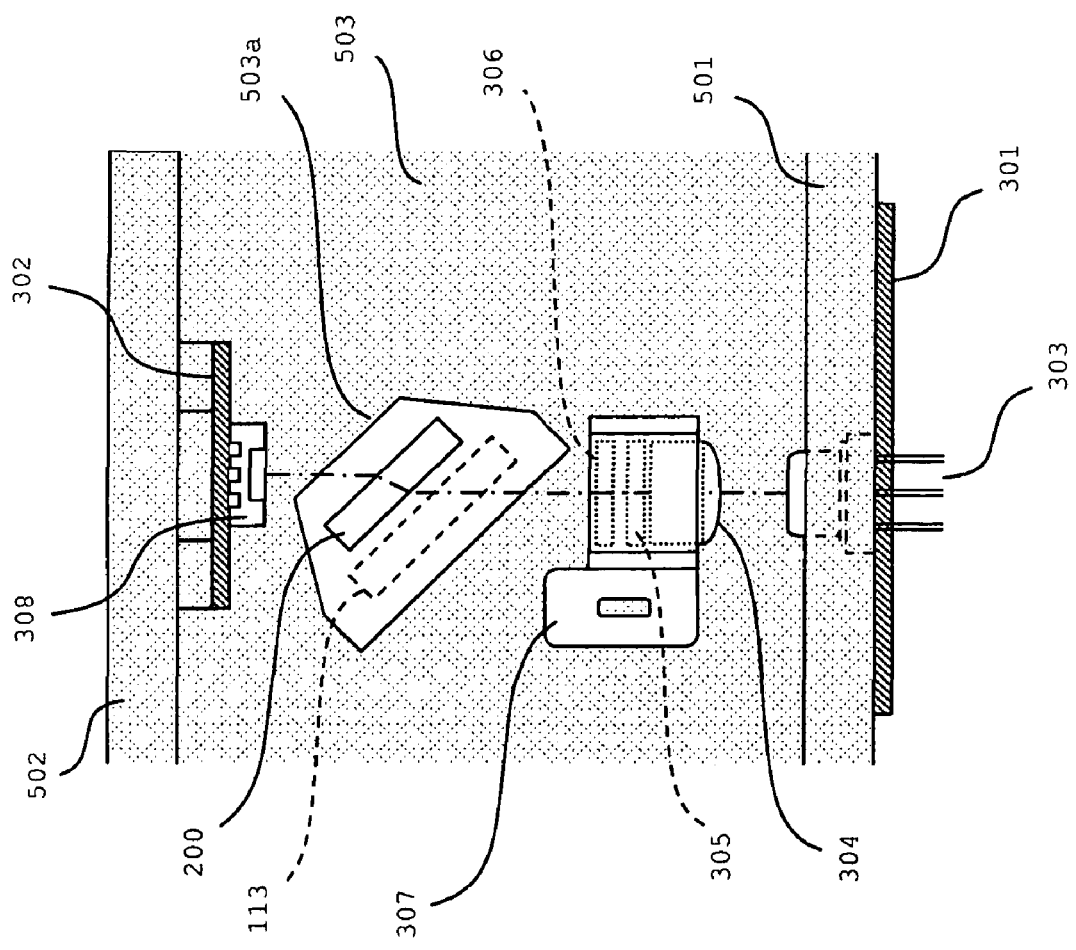

FIG. 3A is a partial plan view of the base 500 viewed from the rear side. FIG. 3A shows a portion of the rear side of the base 500 near the position where the mirror actuator 100 is attached.

As shown in the diagram, at the periphery on the rear side of the base 500, walls 501 and 502 are formed. On the center side of the walls 501 and 502, a plane 503 lower than the walls 501 and 502 is provided. In the wall 501, an opening to which a semiconductor laser 303 is to be attached is formed. By inserting the semiconductor laser 303 in the opening, the circuit substrate 301 to which the semiconductor laser 303 is attached is attached to the outside face of the wall 501. On the other hand, near the wall 502, the circuit substrate 302 to which a PSD 308 is attached is provided.

To the plane 503 on the rear side of the base 500, a condenser lens 304, an aperture 305, and an ND (Neutral Density) filter 306 are attached by a mount 307. Further, the opening 503a is formed in the plane 503, and the transparent member 200 attached to the mirror actuator 100 is projected to the rear side of the base 500 via the opening 503a. The transparent member 200 is positioned so that two planes are parallel to the vertical direction and tilt with respect to the axis of light emitted from the semiconductor laser 303 by 45 degrees when the mirror 113 is in the neutral position.

A laser beam (hereinbelow, called "servo beam") emitted from the semiconductor laser 303 passes through the condenser lens 304. After that, the beam diameter is narrowed by the aperture 305 and, further, light is decreased by the ND filter 306. After that, the servo beam enters the transparent member 200 and is subject to refraction action by the transparent member 200. The servo beam passed through the transparent member 200 is received by the PSD 308 and a position detection signal according to a light reception position is output from the PSD 308.

A part of the servo beam is reflected by an incident surface 200a and an outgoing surface 200b (refer to FIG. 3B) of the transparent member 200. A reflection light amount changes according to the rotation position of the transparent member 200. Specifically, at the time of scanning the target region, when the mirror 113 rotates and the transparent member 200 rotates in association with the rotation of the mirror 113, the reflectance/transmittance of the transparent member 200 changes according to angles. Consequently, the amount of reflection light of the servo beam by the entrance surface 200a and the outgoing surface 200b of the transparent member 200 changes. Therefore, when the outgoing power of the semiconductor laser 303 is constant, the light reception amount in the PSD 308 changes according to rotation of the transparent member 200. Due to this, an error occurs in a position detection signal from the PSD 308.

In the embodiment, to avoid such a convenience, the emission power of the semiconductor laser 303 is controlled so that the servo beam reception amount in the PSD 308 becomes constant. The configuration for controlling the emission power will be described later with reference to FIGS. 5A, 5B and 6.

Figure 4B:
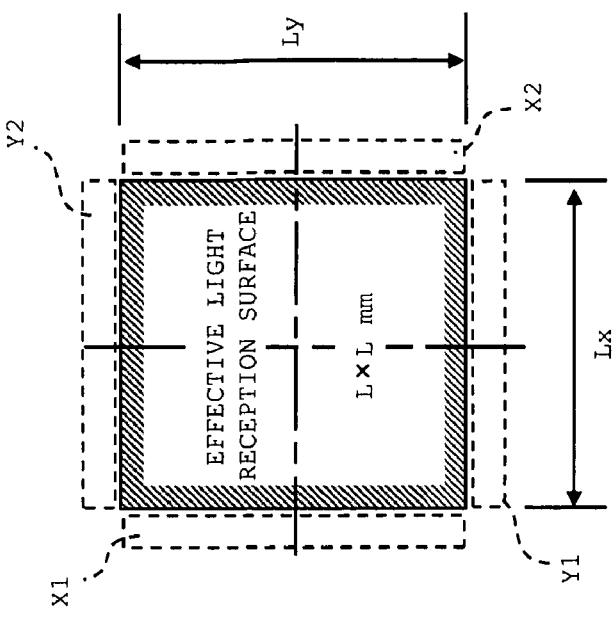
FIGS. 4A and 4B show the configuration of a PSD in the embodiment.
Figure 4A:
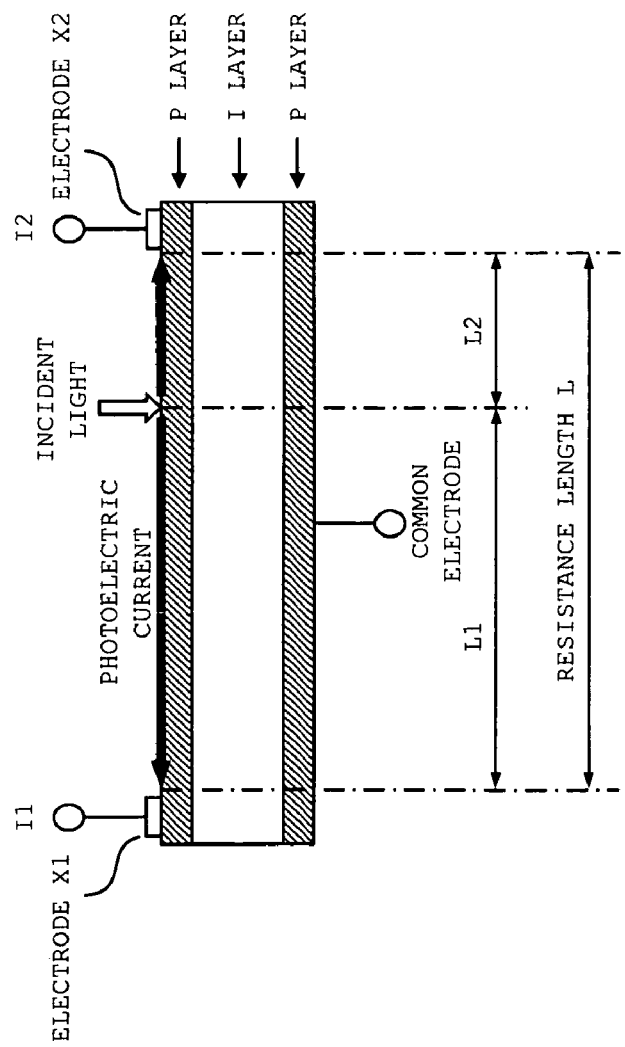

FIG. 4A is a diagram (side cross section) showing the configuration of the PSD 308, and FIG. 4B is a diagram showing the light reception surface of the PSD 308.

Referring to FIG. 4A, the PSD 308 has a structure in which a p-type resistance layer serving as both the light reception surface and a resistance layer is formed on the surface of an N-type high-resistance silicon substrate. On the surface of the resistance layer, electrodes X1 and X2 for outputting photoelectric current in the lateral direction of FIG. 4B and electrodes Y1 and Y2 (not shown in FIG. 4A) for outputting photoelectric current in the vertical direction are formed. On the rear side, a common electrode is formed.

When the light reception surface is irradiated with a laser beam, charges proportional to the light amount are generated in the irradiated position. The charges reach as photoelectric current the resistance layer and are divided in inverse proportion to distance to each of the electrodes, and the resultant currents are output from the electrodes X1, X2, Y1, and Y2. Each of the currents output from the electrodes X1, X2, Y1, and Y2 has a magnitude divided in inverse proportion to the distance from the laser beam irradiation position to the electrode. Therefore, based on values of the currents output from the electrodes X1, X2, Y1, and Y2, the light irradiation position on the light reception surface can be detected.

Figure 5B:
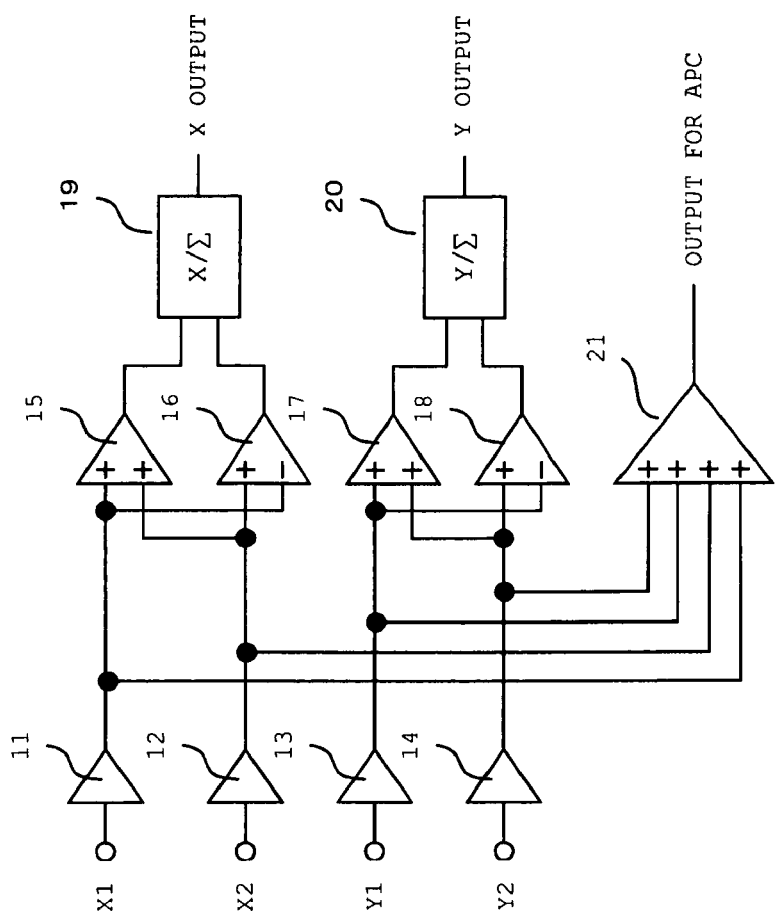
FIGS. 5A and 5B are diagrams for explaining a method of generating a position detection signal in the embodiment.
Figure 5A:
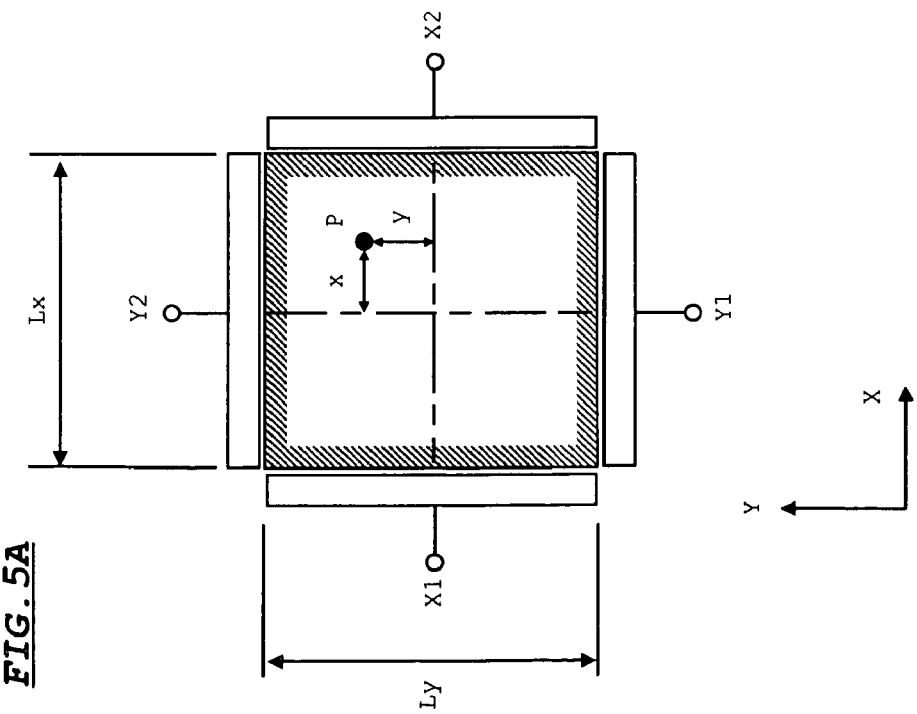

For example, it is assumed that a position P in FIG. 5A is irradiated with a servo beam. In this case, when amounts of currents output from the electrodes X1, X2, Y1, and Y2 are Ix1, Ix2, Iy1, and Iy2, respectively, and distances between the electrodes in the X and Y directions are Lx and Ly, coordinates (x, y) of the position P using the center of the light reception surface as a reference point are calculated by, for example, the following formulas.

$$\frac{Ix2 - Ix1}{Ix2 + Ix1} = \frac{2x}{Lx} \quad (1)$$

$$\frac{Iy2 - Iy1}{Iy2 + Iy1} = \frac{2y}{Ly} \quad (2)$$

FIG. 5B is a diagram showing the configuration of an arithmetic circuit realizing the calculation formulas. The current signals Ix1, Ix2, Iy1, and Iy2 output from the electrodes X1, X2, Y1, and Y2 are amplified and voltage-converted by I/V amplifiers 11, 12, 13, and 14, respectively. By addition circuits 15 and 17, (Ix2+Ix1) and (Iy2+Iy1) in the formulas are calculated. By subtraction circuits 16 and 18, (Ix2−Ix1) and (Iy2−Iy1) in the formulas are calculated. Further, by division circuits 19 and 20, division in the left sides of the formulas (1) and (2) is performed. From the division circuits 19 and 20, position detection signals indicative of an X-direction position (2x/Lx) and a Y-direction position (2y/Ly) in the servo beam reception position P are output.

In the calculation, when the servo beam reception amount in the PSD 308 changes as the transparent member 200 rotates, the denominators and numerators in the left sides of the formulas (1) and (2) change. In principle, by using the formulas, detection of a position signal which does not depend on the light amount is possible. However, in reality, an error occurs in the position detection using the light amount depending on a condition such as setting of the gain of an I/V conversion circuit 2 (which will be described later) or the number of bits of an A/D converter 4 (which will be described later). The smaller a change in the servo beam reception amount in the PSD 308 is, the more the error is suppressed.

In the embodiment, as described above, the emission power of the semiconductor laser 303 is controlled so that the servo beam reception amount in the PSD 308 becomes constant. Consequently, fluctuations in the PSD light reception amount when the transparent member 200 rotates are suppressed, and an error included in the position detection signal can be suppressed.

Concretely, as shown in FIG. 5B, signals from the I/V amplifiers 11, 12, 13, and 14 are added by an addition circuit 21. An output from the addition circuit 21 has a magnitude corresponding to the total light reception amount of the PSD 308. The emission power of the semiconductor laser 303 is controlled so that an output (output for APC) from the addition circuit 21 had a predetermined magnitude. By the control, the servo beam reception amount in the PSD 308 becomes almost constant irrespective of the rotation position of the transparent member 200.

Figure 6:
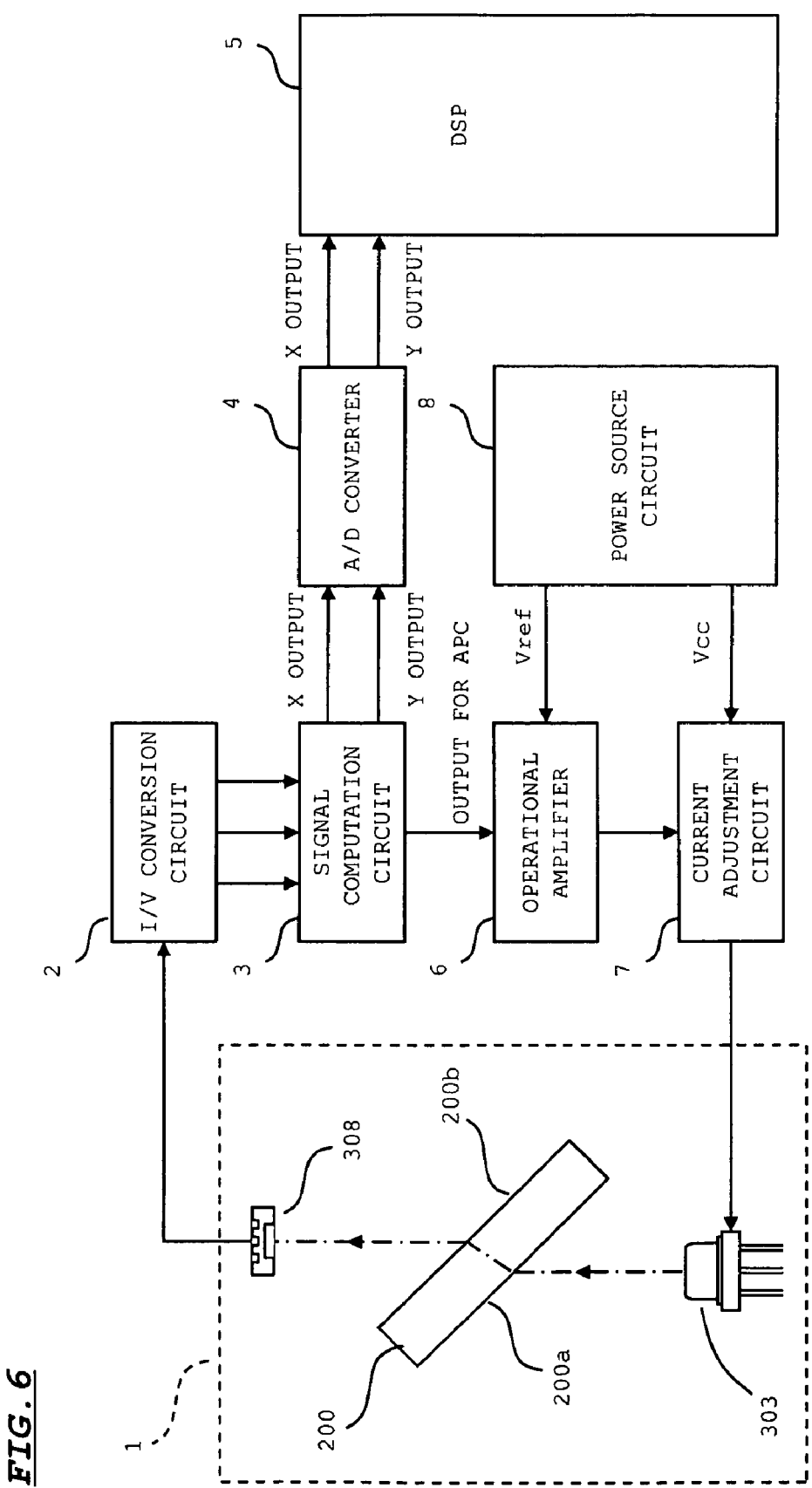
FIG. 6 shows the configuration of a power adjustment circuit in the embodiment.

FIG. 6 is a diagram showing the configuration of a power adjustment circuit for adjusting outgoing power of the semiconductor laser 303. The power adjustment circuit has the I/V conversion circuit 2, a signal computation circuit 3, an operational amplifier 6, a current adjustment circuit 7, and a power source circuit 8. In FIG. 6, for convenience, circuits (the A/D converter 4 and a DSP 5) for processing a position detection signal from the PSD 308 are shown. In the diagram, 1 denotes an optical system for servo which includes the semiconductor laser 303, the transparent member 200, and the PSD 308.

The I/V conversion circuit 2 has the configuration of the I/V amplifiers 11 to 14 in FIG. 5B. The signal computation circuit 3 has a configuration of the addition circuits 15, 17, and 21, the subtraction circuits 16 and 18, and the division circuits 19 and 20. An X output and a Y output (refer to FIG. 5B) output from the signal computation circuit 3 are converted by the A/D converter 4 to digital signals, and the digital signals are input to the DSP (Digital Signal Processor) 5. The DSP 5 detects the scan position of the laser beam in the target region based on the input X and Y outputs, and executes control of driving the mirror actuator 100, control of driving the laser light source 401, and the like.

An output for APC (refer to FIG. 5B) output from the signal computation circuit 3 is input to the operational amplifier 6. The operational amplifier 6 compares the APC output with a reference voltage Vref of a predetermined level input from the power source circuit 8, and then outputs the control signal according to the comparison result to the current adjustment circuit 7. The operational amplifier 6 increases the control signal until the APC output becomes the reference voltage Vref and, when the APC output exceeds the reference voltage Vref, decreases the control signal. The current adjustment circuit 7 is constructed by a resistor and a transistor and supplies a drive signal having a magnitude proportional to the control signal input from the operational amplifier 6 to the semiconductor laser 303.

When the transparent member 200 rotates in association with rotation of the mirror 113 and the amount of the servo beam incident on the PSD 308 decreases, the APC output supplied to the operational amplifier 6 becomes smaller than the reference voltage Vref, and the control signal output from the operational amplifier 6 increases. Accordingly, the drive current supplied from the current adjustment circuit 7 to the semiconductor laser 303 increases, and the emission power of the servo beam increases. On the other hand, when the amount of the servo beam incident on the PSD 308 increases by the rotation of the transparent member 200, the APC output supplied to the operational amplifier 6 becomes larger than the reference voltage Vref, and the control signal output from the operational amplifier 6 decreases. As a result, the drive current supplied from the current adjustment circuit 7 to the semiconductor laser 303 decreases, and the emission power of the servo beam decreases.

By such servo operation, the emission power of the semiconductor laser 303 is controlled so that the APC output matches the reference voltage Vref. Therefore, the servo beam having almost constant intensity is led to the PSD 308 irrespective of the rotation position of the transparent member 200.

According to the embodiment, the emission power of the semiconductor laser 303 is adjusted so that the servo beam reception amount in the PSD 308 becomes constant. Consequently, even when the transparent member 200 rotates as the mirror 113 rotates and the ratio of the servo beam reflected by the incident surface 200a and the outgoing surface 200b of the transparent member 200 changes according to the rotation, the amount of the servo beam led to the PSD 308 is maintained almost constant. Therefore, an error in the position detection signal output from the PSD 308 can be suppressed, and the laser beam scan position in the target region can be detected with high precision.

Further, according to the embodiment, the transparent member 200 is attached to the support shaft 112 for rotating the mirror 113, the behavior of the mirror 113 can be directly reflected in the transparent member 200. Therefore, from a result of detection of the rotation position in the transparent member 200, the laser beam scan position in the target region can be detected with high precision.

The embodiment of the present invention has been described above. The present invention is not limited to the foregoing embodiment. The embodiment of the present invention can be variously modified.

For example, in the foregoing embodiment, the semiconductor laser is used as the light source of a servo beam. In place of the semiconductor laser, an LED (Light Emitting Diode) can be used.

Figure 7:
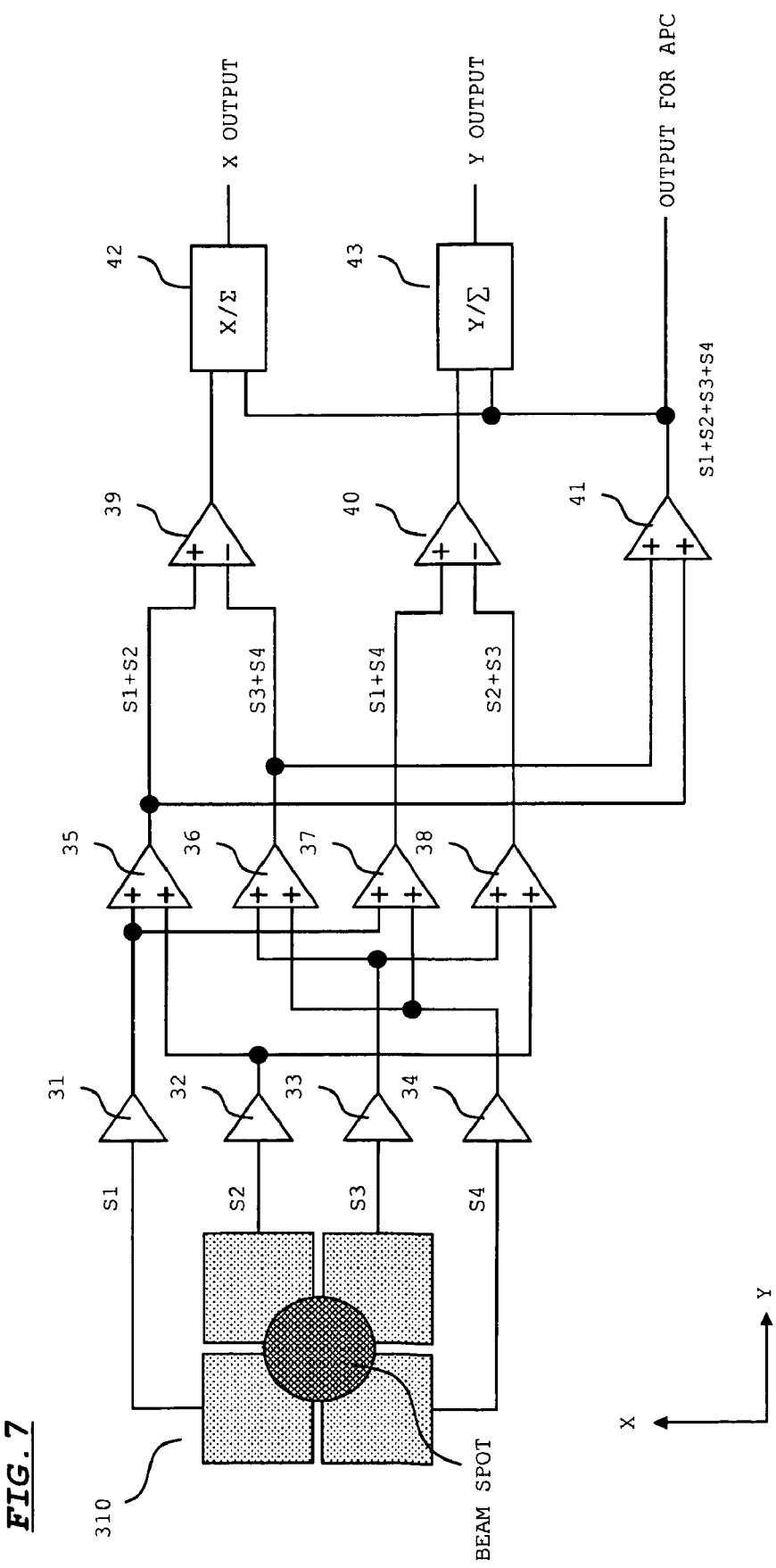
FIG. 7 shows an example of changing a photodetector and a signal arithmetic circuit in the embodiment.
Figure 8A:
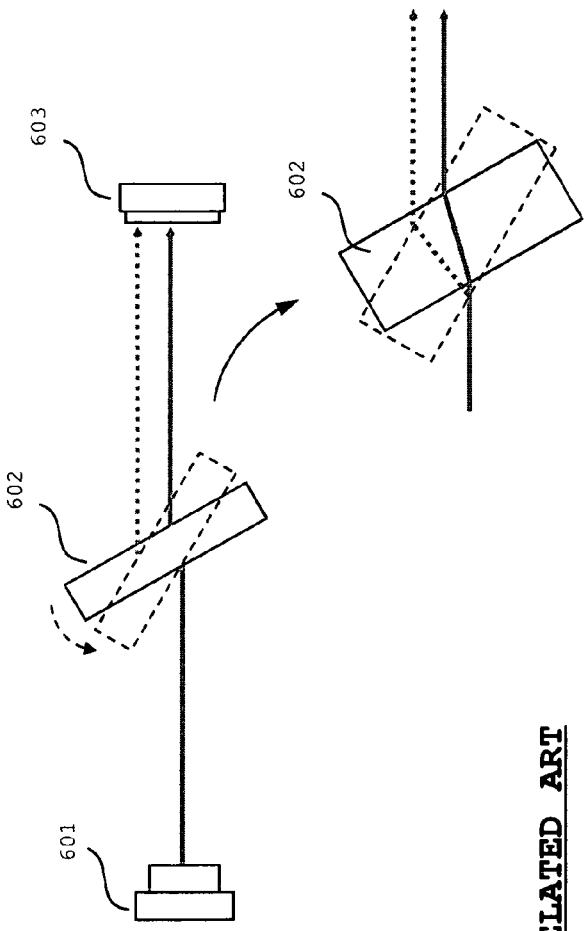
FIGS. 8A and 8B are diagrams for explaining a method of detecting a position using a light refraction device and a mirror of a related art.
Figure 8B:
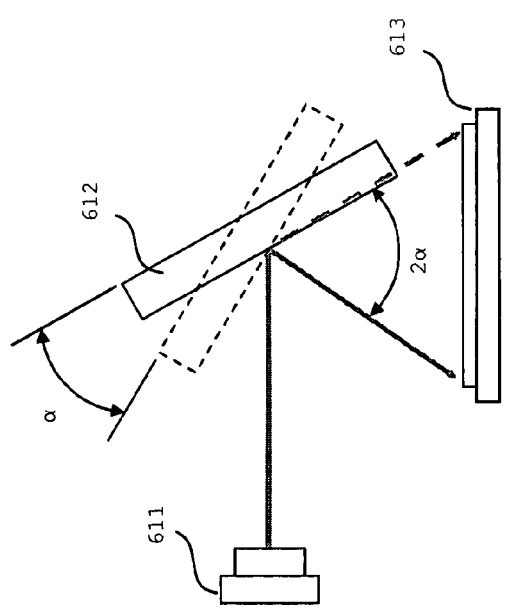

In the foregoing embodiment, the PSD is used as a photodetector for receiving a servo beam. As shown in FIG. 7, a four-division sensor 310 can be also used as the photodetector. In this case, when the mirror 113 is in the neutral position, the servo beam falls on the center position of the four-division sensor 310. When output signals from the sensors are S1, S2, S3, and S4 as shown in the diagram, an X-direction position and a Y-direction position of a beam spot are calculated by, for example, the following formulas.

$$\frac{(S1+S2)-(S3+S4)}{S1+S2+S3+S4} = x \quad (3)$$

$$\frac{(S1+S4)-(S2+S3)}{S1+S2+S3+S4} = y \quad (4)$$

FIG. 7 also shows the configuration of an arithmetic circuit realizing the calculation formulas. The signals S1, S2, S3, and output from the sensors are amplified and voltage-converted by I/V amplifiers 31, 32, 33, and 34, respectively. By addition circuits 35, 36, 37, and 38, (S1+S2), (S3+S4), (S1+S4), and (S2+S3) are calculated, respectively. By subtraction circuits 39 and 40, (S1+S2)−(S3+S4) and (S1+S4)−(S2+S3) are calculated. Further, by an addition circuit 41, (S1+S2+S3+S4) is calculated. By division circuits 42 and 43, division in the left sides of the formulas (3) and (4) is performed. From the division circuits 42 and 43, position detection signals (outputs x and y) indicative of the servo beam reception positions in the X direction and the Y direction are output.

As shown in FIG. 7, in the case of using the four-division sensor 310 as the photodetector, using the output signal from the addition circuit 41, the power of the servo beam is adjusted. That is, an output signal from the addition circuit 41 is used as the output for APC and is input to the operational amplifier 6 in FIG. 6. In this case as well, in a manner similar to the above, the emission power of the semiconductor laser 303 is adjusted so that the servo beam reception amount in the four-division sensor 310 becomes almost constant. As a result, in a manner similar to the above, an error in the position detection signal caused by rotation of the transparent member 200 can be suppressed, and the laser beam scan position in the target region can be detected with high precision.

In the foregoing embodiment, as shown in FIG. 5B, outputs from the I/V amplifiers 11 to 14 are added to generate an output for APC. For example, by outputs from the I/V amplifiers 11 and 12, an output for APC may be generated. For example, by adding outputs from the I/V amplifiers 13 and 14, an output for APC may be generated. That is, an output for APC may be an output in which the servo beam reception amount in the PSD 308 is reflected. With the configuration as shown in FIG. 5B, the output for APC can be increased and can accurately correspond to a change in the servo beam reception amount.

The embodiment of the present invention can be properly variously modified in the scope of the technical ideas shown in the scope of claims for patent.

What is claimed is:

1. A beam irradiation apparatus for scanning a target region with a laser beam, comprising:
   an optical element which changes a travel direction of a laser beam by being rotated in a predetermined direction;
   an actuator which rotates the optical element in the direction;
   a refractive element which is arranged in the actuator and rotates in association with rotation of the optical element;
   a servo beam source which emits a servo beam to the refractive element;
   a photodetector which receives the servo beam refracted by the refractive element and outputs a signal according to a position where the servo beam is received; and
   a power adjustment circuit which adjusts emission power of the servo beam source,
   wherein the power adjustment circuit adjusts the emission power so that a reception amount of the servo beam in the photodetector becomes constant based on the output signal from the photodetector.

2. The beam irradiation apparatus according to claim 1, wherein the power adjustment circuit has an arithmetic circuit which generates a signal according to a total reception amount of the servo beam in the photodetector, and adjusts the emission power based on the signal generated by the arithmetic circuit.

3. The beam irradiation apparatus according to claim 1, wherein the refractive element is a translucent member having a flat plate shape.

4. The beam irradiation apparatus according to claim 1, wherein the optical element is a mirror.

5. The beam irradiation apparatus according to claim 1, wherein the actuator comprises:
   a first support part which supports the optical element so as to be rotatable in a first direction;
   a second support part which supports the first support part so as to be rotatable in a second direction different from the first direction; and
   an electromagnetic drive part which drives the first and second support parts in the first and second directions.

6. The beam irradiation apparatus according to claim 1, wherein the refractive element is attached to a rotation shaft which rotates the optical element.

* * * * *